April 15, 1952     D. C. CHASE ET AL     2,593,265
APPARATUS FOR TREATING PLASTIC MATERIALS
Filed Oct. 11, 1950     3 Sheets-Sheet 1
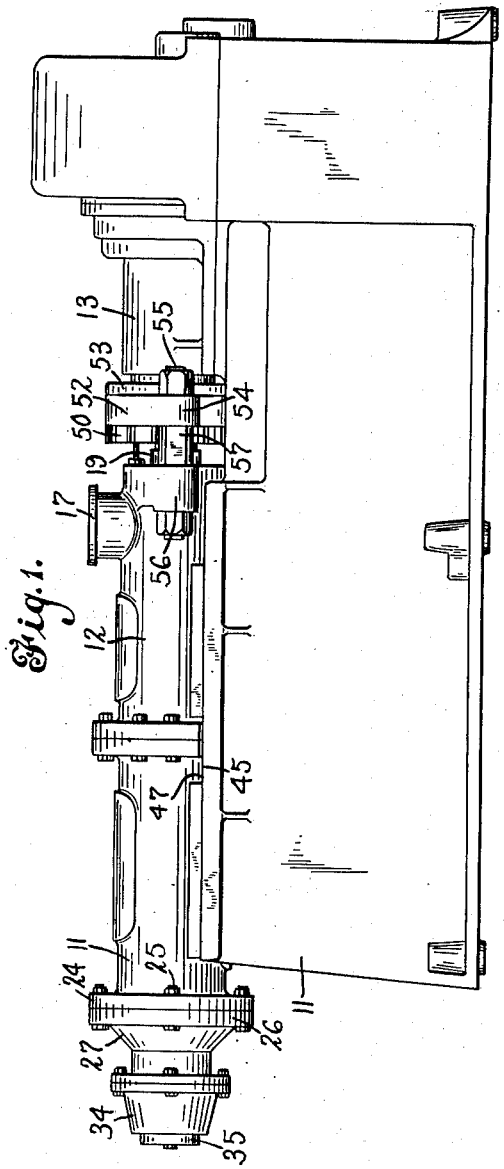
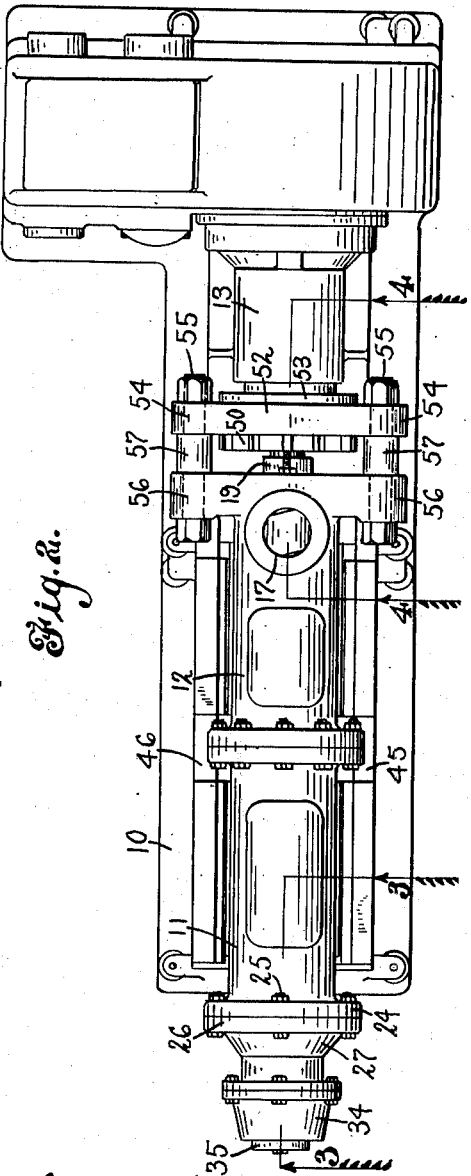
Inventors
Donald C. Chase
and John W. Joyner
By Rockwell & Bartholow
Attorneys

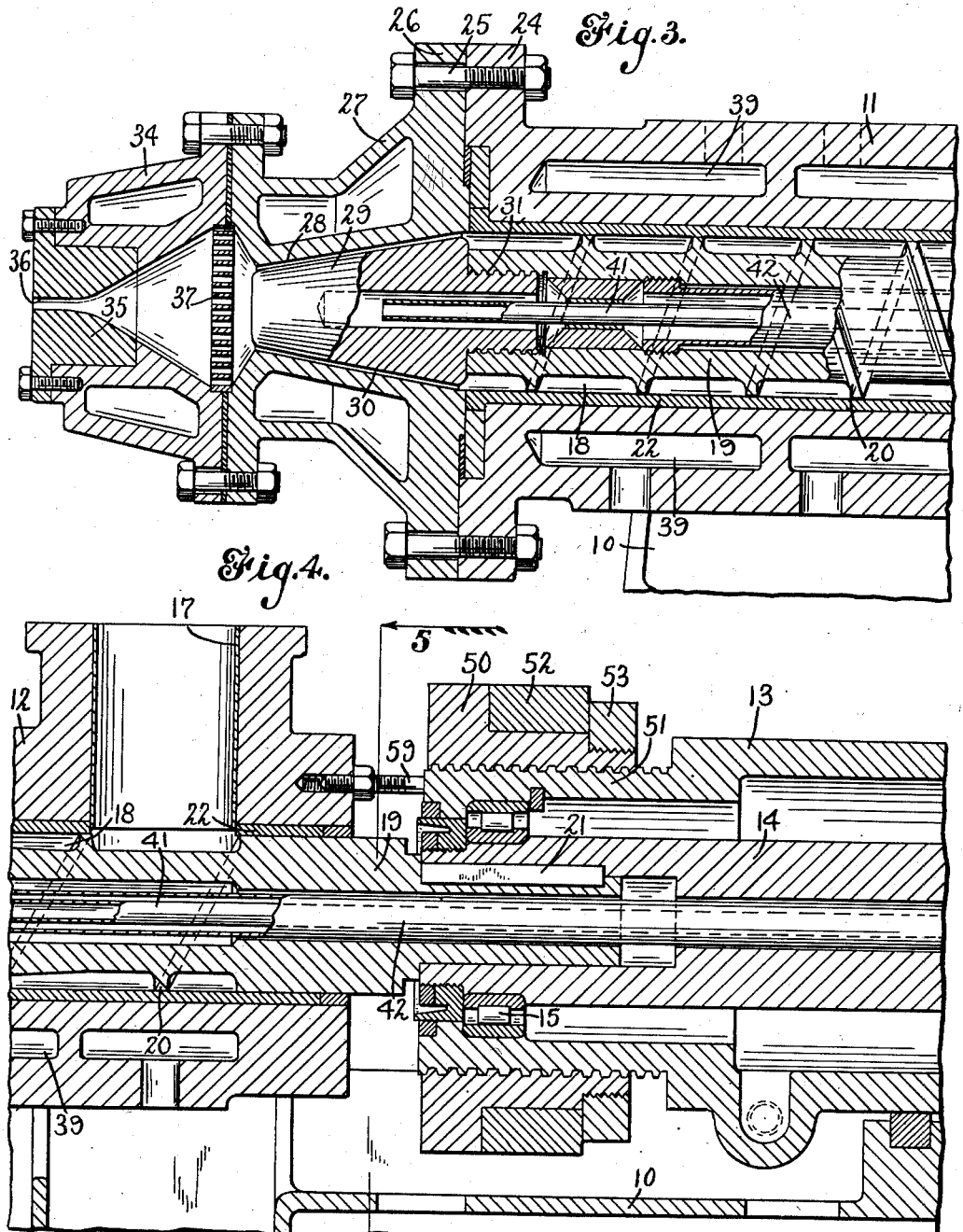

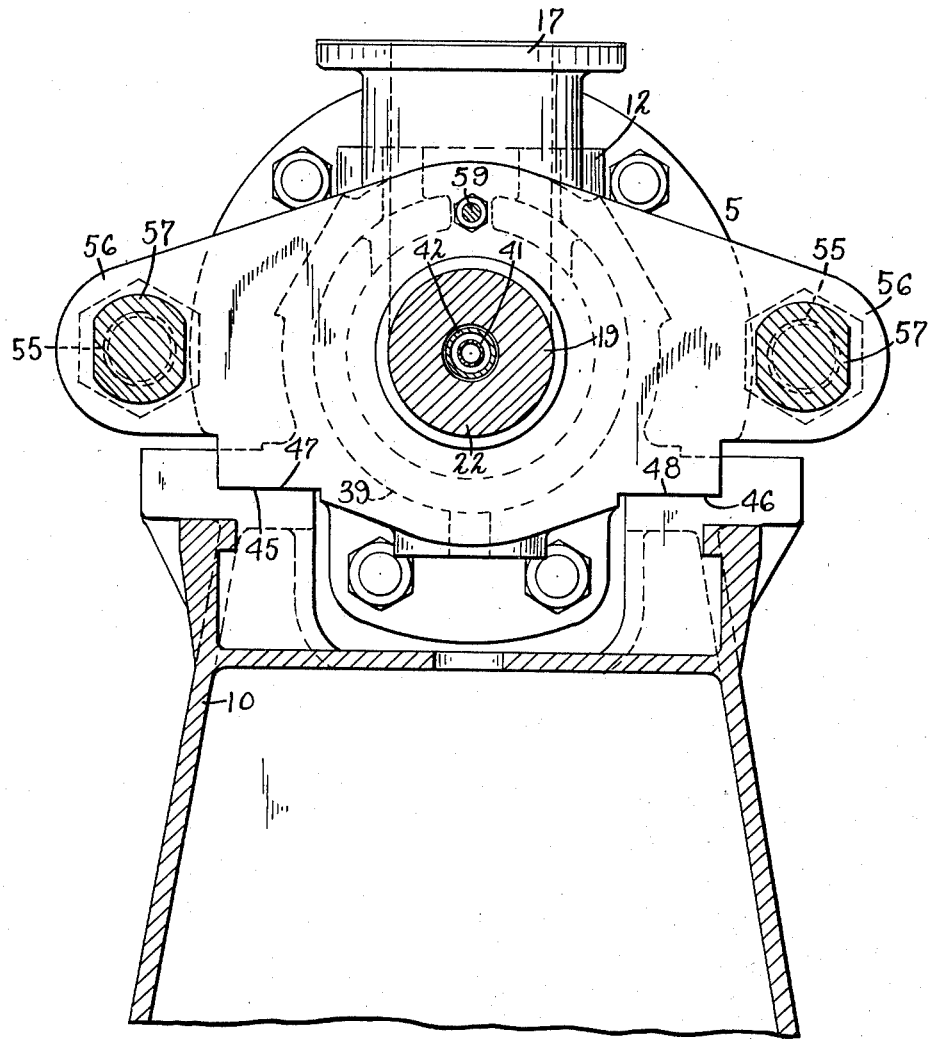

Patented Apr. 15, 1952

2,593,265

UNITED STATES PATENT OFFICE 2,593,265

APPARATUS FOR TREATING PLASTIC MATERIALS

Donald C. Chase, Milford, and John M. Joyner, Winsted, Conn., assignors to Farrel-Birmingham Company, Incorporated, Ansonia, Conn., a corporation of Connecticut Application October 11, 1950, Serial No. 189,656

4 Claims. (Cl. 18—12)

This invention relates to a method of treating plastic or thermoplastic materials and more particularly to an extrusion apparatus designed to receive such materials in granular, powdered, or other solid forms, and reducing them to plastic form by subjecting them to a certain amount of working or kneading action while at the same time propelling them forwardly in order to extrude them through a relatively narrow space, and thus causing them to be subjected to the desired amount of pressure.

In the form of our device illustrated in the drawings, the materials are extruded through a die opening of a desired shape and prior to this extrusion are forced through a relatively narrow annular space, the width of which may be regulated as desired in order to regulate the pressure to which the material is subjected in the chamber of the device, which at the same time regulates to some extent the quantity of material which is extruded from the apparatus.

As illustrated, the apparatus comprises a chamber within which is provided a screw propeller to propel the material forwardly, and upon the forward end of the propeller shaft is an end portion of frusto-conical shape, which portion is located in a part of the chamber of complementary shape. It will be obvious that, due to this arrangement, relative longitudinal adjustment of the propeller shaft and the chamber will effect an adjustment of the width of the space between the inner surface of the chamber and the conical or frusto-conical portion of the shaft, and thus regulate the size of this space and the pressure to which the material is subjected in the chamber.

One object of the present invention is to provide a plasticizing apparatus of the character described wherein longitudinal, relative adjustments may be effected between the chamber and the rotor mounted in the chamber to regulate the pressure to which the material is subjected in its passage through the chamber.

A still further object of the invention is the provision of an extrusion apparatus for treating plastic materials comprising a chamber and a screw propeller mounted in the chamber, the propeller shaft having, on the forward end thereof, a conical or frusto-conical portion cooperating with a portion of the chamber of complemental shape, wherein means are provided for effecting relative longitudinal adjustment of the chamber and the propeller shaft.

Still another object of the invention is to provide an extrusion apparatus for plastic materials of the character described wherein a screw propeller is mounted within a chamber, which chamber is adjustable relatively to the shaft, to adjust the width of the annular space existing between a frusto-conical portion of the propeller shaft and a similarly shaped cooperating portion of the chamber.

To these and other ends the invention consists in the novel features and combinations of parts to be hereinafter described and claimed.

In the accompanying drawings:

Fig. 1 is a side elevational view of an extrusion apparatus embodying our invention;

Fig. 2 is a top plan view of the same;

Fig. 3 is a longitudinal sectional view through the delivery end portion of the apparatus on line 3—3 of Fig. 2;

Fig. 4 is a longitudinal sectional view through the rear end portion of the chamber and associated parts on line 4—4 of Fig. 2; and Fig. 5 is a transverse sectional view on line 5—5 of Fig. 4.

To illustrate a preferred embodiment of our invention, we have shown in the drawings an apparatus for treating plastic materials comprising a supporting base 10, having a chamber casing supported thereon comprising sections 11 and 12, and also having supported thereon a housing 13 for the drive mechanism of any usual form. The particular features of the drive mechanism are not of importance in the present invention and hence are not illustrated in detail except that, as shown in Fig. 4, this mechanism includes a drive shaft 14 supported in bearings 15 carried by the housing 13.

The casing section 12 is provided with a hopper 17, which hopper leads into the rotor chamber 18, within which is mounted a rotor in the form of a propeller screw, this member comprising a shaft 19 and a helical screw 20, and the screw being pitched to propel the material in the chamber forwardly from the hopper or in a left-hand direction as shown in Fig. 1. The shaft 19 of the screw propeller is splined to the driving shaft 14, as shown at 21, in order to be driven thereby. The chamber 18 may be provided with a hardened steel lining 22 and, as shown in Fig. 3 of the drawings, the chamber, together with the lining 22 and the screw propeller, extends throughout the casing sections 11 and 12.

As shown in Fig. 3 of the drawings, the casing section 11 is provided with a flange 24 to which is secured by bolts 25 the flange 26 of a casing extension member 27, this member being provided with a central opening or chamber 28 of frusto-conical shape, which chamber communicates with, and forms and extension of, the chamber 18 of the casing section 11.

Within the chamber 28 is a hub or extrusion member 29 which is also of frusto-conical shape and, as shown, the elements of the surface of this member are substantially parallel with those of the inner surface of the chamber 28 so that an annular space 30 will be provided about the member 29, this space being of substantially uniform width. The member 29 is rigidly secured to the propeller shaft 19 by being threaded into the bore of this shaft, as shown at 31.

To the forward end of the casing extension 27 is secured a die supporting member 34, having mounted therein a die 35, having a die opening 36 of the desired shape through which the material is extruded. A perforated strainer plate 37 may be provided adjacent the junction of the member 34 in the casing extension 27 so that the material will pass through this strainer plate in its passage through the apparatus so that foreign material and any unplasticized lumps may be strained therefrom.

The casing sections 11 and 12 may be cored out, as shown at 39, so that a fluid (either hot or cold as desired) may be passed through these cored passages to maintain the desired temperature within the chamber. Also, a heating or cooling fluid may be passed through the propeller or rotor shaft by means of inner and outer pipes 41 and 42 provided in the hollow interior of this shaft.

It will be obvious that due to the frusto-conical shape of the chamber extension section 28 and the member 29 on the end of the rotor, the width of the space 30 may be regulated by effecting relative longitudinal adjustment of the propeller shaft and the casing section 27. Either of these members may be adjusted with respect to the other, but in the present instance we have provided a convenient method of adjusting the casing of the chamber with respect to the shaft and, therefore, with respect to the member 29. To this end the base 10 is provided with supporting ways 45 and 46 (Fig. 5) and the casing sections on their lower surfaces are provided with cooperating supporting members 47 and 48 resting on these ways so that the chamber casing as a whole is slidable upon the ways 45 and 46 carrying with it the extension 27.

An adjusting nut 50 (Fig. 4) is threadedly mounted on a reduced portion 51 of the housing 13 of the drive mechanism so that, when this nut is rotated, it will travel longitudinally up the axis of the casing. Rotatably mounted on this nut is a collar 52, the collar being held in place by a retainer 53 threaded to the nut 50, it being understood that the nut 50 is rotatable with respect to the collar 52. As shown in Fig. 2, this collar is provided with laterally projecting lugs 54 which are secured by bolts 55 to lugs 56 provided upon the casing section 12. Spacing members 57 are provided between the lugs 54 and 56 so that the collar 52 is held in a definite spaced relation to the casing of the apparatus.

With this construction it will be apparent that as the adjusting nut 50 is rotated upon the threaded portion 51, the casing comprising the sections 11 and 12 will be moved forwardly or rearwardly with respect to the housing 13 of the drive mechanism. An adjustable stop member 59 may be provided to limit the approaching movement of the chamber casing toward the housing of the drive mechanism.

The propeller shaft 19, and therefore the member 29, is fixed against longitudinal movement and thus movement of the casing toward and from the drive housing will move the casing extension 27 relatively to the member and thus vary the width of the space 30 between these members. Adjustment of the casing rearwardly will cause the inner surface of the member 27 to approach the surface of the member 29 and thus reduce the width of the annular space through which the charge travels and will increase the pressure on the charge within the chamber. Movement of the casing in the opposite direction will increase the width of the annular passage through which the plasticized material passes. It may be found expedient to construct the frusto-cone 29 and its cooperating chamber 28 with very slight variance in angles to exert some influence on the axial flow of material and consequent intensity of kneading and working thereof.

While we have shown and described a preferred embodiment of our invention, it will be understood that it is not to be limited to all of the details shown, but is capable of modification and variation within the spirit of the invention and within the scope of the claims.

What we claim is:

1. An apparatus for treating plastic materials comprising a casing providing a chamber having a discharge opening adjacent one end, a rotary propeller in the chamber to force the material therethrough and extrude it through said opening, said propeller having a member of frusto-conical shape adjacent its forward end, said casing having a cooperating chamber portion of similar shape, a base on which said casing is slidably mounted, a housing for a drive mechanism carried by said base adjacent the casing into which housing a propeller shaft extends, an adjusting nut rotatably carried by a part of said housing for adjustment thereon in a longitudinal direction relatively to the propeller shaft, and means connecting said nut to said casing to adjust the latter relatively to the propeller shaft.

2. An apparatus for treating plastic materials comprising a casing providing a chamber having a discharge opening adjacent one end, a rotary propeller in the chamber to force the material therethrough and extrude it through said opening, said propeller having a member of frusto-conical shape adjacent its forward end, said casing having a cooperating chamber portion of similar shape, a base on which said casing is slidably mounted, a housing for a drive mechanism carried by said base adjacent the casing into which housing a propeller shaft extends, an adjusting nut threadedly mounted on a part of the housing, an adjusting collar rotatably carried by said nut but otherwise secured against movement relatively thereto, and means connecting said collar to said casing whereby when the nut is threadedly adjusted on the housing the casing will be adjusted relatively to the propeller shaft.

3. An apparatus for treating plastic materials comprising a casing providing a chamber having a discharge opening adjacent one end, a rotary propeller in the chamber to force the material therethrough and extrude it through said opening, said propeller having a member of frusto-conical shape adjacent its forward end, said casing having a cooperating chamber portion of similar shape, a base on which said casing is slidably mounted, a housing for a drive mechanism carried by said base adjacent the casing into which housing a propeller shaft extends, an adjusting nut threadedly mounted upon a part of the housing, a collar mounted upon said nut to permit the nut to rotate relatively thereto, means to restrain said collar from movement relatively to the nut in a direction longitudinally of the housing whereby when the nut is threadedly adjusted on the housing the collar will be moved longitudinally of the housing, and means for connecting said collar to the casing to adjust the latter relatively to the propeller shaft.

4. An apparatus for treating plastic materials comprising a casing providing a chamber having a discharge opening adjacent one end, a rotary propeller in the chamber to force the material therethrough and extrude it through said opening, said propeller having a member of frusto-conical shape adjacent its forward end, said casing having a cooperating chamber portion of similar shape, a base on which said casing is slidably mounted, a housing for a drive mechanism carried by said base adjacent the casing into which housing a propeller shaft extends, an adjusting nut threadedly mounted upon a part of the housing, a collar mounted upon said nut to permit the nut to rotate relatively thereto, means to restrain said collar from movement relatively to the nut in a direction longitudinally of the housing whereby when the nut is threadedly adjusted on the housing the collar will be moved longitudinally of the housing, means for connecting said collar to the casing to adjust the latter relatively to the propeller shaft, said last-named means comprising laterally projecting lugs on said collar and casing, and means connecting said lugs.

DONALD C. CHASE.
JOHN M. JOYNER.

REFERENCES CITED

The following references are of record in the file of this patent:

UNITED STATES PATENTS

| Number | Name | Date |
|---|---|---|
| 1,849,291 | Gordon | Mar. 15, 1932 |
| 1,935,050 | Gordon | Nov. 14, 1933 |